US010185458B2

(12) United States Patent
Bridge et al.

(10) Patent No.: US 10,185,458 B2
(45) Date of Patent: Jan. 22, 2019

(54) SHARING LOCATION INFORMATION DURING A COMMUNICATION SESSION

(71) Applicant: Facebook, Inc., Menlo Park, CA (US)

(72) Inventors: Henry Bridge, Brooklyn, NY (US); Francis Luu, San Francisco, CA (US); Nathan Borror, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 435 days.

(21) Appl. No.: 14/954,761

(22) Filed: Nov. 30, 2015

(65) Prior Publication Data

US 2016/0085386 A1 Mar. 24, 2016

Related U.S. Application Data

(63) Continuation of application No. 14/266,908, filed on May 1, 2014, now Pat. No. 9,225,748, which is a continuation of application No. 13/598,191, filed on Aug. 29, 2012, now Pat. No. 8,787,888.

(51) Int. Cl.
| | |
|---|---|
| *H04W 64/00* | (2009.01) |
| *G06F 3/0481* | (2013.01) |
| *H04L 29/06* | (2006.01) |
| *H04W 4/02* | (2018.01) |
| *G06Q 10/10* | (2012.01) |
| *G06Q 50/00* | (2012.01) |
| *H04M 1/725* | (2006.01) |

(52) U.S. Cl.
CPC ........... *G06F 3/0481* (2013.01); *G06Q 10/10* (2013.01); *G06Q 50/01* (2013.01); *H04L 65/1003* (2013.01); *H04M 1/72519* (2013.01); *H04W 4/02* (2013.01); *H04W 64/003* (2013.01)

(58) Field of Classification Search
CPC ..... H04W 12/06; H04W 76/02; H04W 4/008; H04W 4/80
See application file for complete search history.

(56) References Cited

U.S. PATENT DOCUMENTS

| | | | | |
|---|---|---|---|---|
| 8,359,643 | B2 * | 1/2013 | Low | H04W 4/08 370/254 |
| 8,787,888 | B2 * | 7/2014 | Bridge | H04L 65/1003 455/415 |
| 9,225,748 | B2 * | 12/2015 | Bridge | H04L 65/1003 |
| 2011/0131358 | A1 * | 6/2011 | Ganesh | G01C 21/265 710/304 |
| 2011/0165890 | A1 * | 7/2011 | Ho | G01C 21/265 455/456.1 |
| 2012/0021778 | A1 * | 1/2012 | Ho | G01C 21/265 455/457 |
| 2012/0030393 | A1 * | 2/2012 | Ganesh | G01C 21/265 710/303 |
| 2012/0329441 | A1 * | 12/2012 | Tseng | G01C 21/265 455/418 |
| 2014/0135037 | A1 * | 5/2014 | Dave | H04W 4/21 455/456.3 |
| 2018/0032997 | A1 * | 2/2018 | Gordon | G06Q 20/3224 |

* cited by examiner

*Primary Examiner* — Diane Mizrahi
(74) *Attorney, Agent, or Firm* — Baker Botts L.L.P.

(57) ABSTRACT

In one embodiment, a method includes receiving user input on a graphical user interface of a first computing device to provide location information associated with the first computing device to a second computing device. The current location of the first computing device is accessed, and the current location is sent to one or more second computing devices, the current location being displayed in a graphical user interface of the second computing devices.

18 Claims, 5 Drawing Sheets

SHARING LOCATION INFORMATION DURING A COMMUNICATION SESSION

PRIORITY

This application is a continuation under 35 U.S.C. § 120 of U.S. patent application Ser. No. 14/266,908, filed 1 May 2014, which is a continuation under 35 U.S.C. § 120 of U.S. patent application Ser. No. 13/598,191, filed 29 Aug. 2012, each of which is incorporated herein by reference.

TECHNICAL FIELD

This disclosure generally relates to sharing location information during a communication session.

BACKGROUND

Individuals may communicate with each other using a variety of methods including emails, text messages, instant messages, social networking messages, and other communication methods from various locations. Many times an interface built for carrying messaging of these types is limited specifically to the specific type of communication being exchanged. For example, an interface that displays text messages may only display text messages created by the participants in the communication. Similarly, an interface that displays social networking messages may only display social networking messages created by the participants in the communication. For the communication participants, the narrow context of these interfaces can be limiting.

SUMMARY OF PARTICULAR EMBODIMENTS

In particular embodiments, a method includes establishing a communication session between a first device and a second device. The first device may be a mobile computing device. The second device may receive a location of the first device. The second device may display the location of the first device on a graphical user interface of the second device during the communication session.

Users of communication systems often communicate with one another from disparate geographic locations. During a communication session, such as when communicating via text messages, a user may want to provide his or her location to the other participants of the conversation, for example, to facilitate meeting in person. In this example, the user may try to provide the location manually using text messages and/or may resort to calling the other participants of the conversation to give a verbal description of their location. If the user's location is changing (e.g., because they are moving to meet the other participants), the user may have to continually provide the location manually. Additionally, this manual form of location sharing may be limiting if, for example, the user does not know her exact location or cannot articulate her location precisely. Particular embodiments of the present disclosure allow the user's mobile device to automatically provide his or her location to other conversation participants. The location provided may be more accurate than what the user could have provided manually. Furthermore, the location may be updated periodically as the user's geographic location changes. Moreover, the other participants may be able to view both the user's location and the previous messages in the communication session at the same time.

During a communication session, participants may use various methods of communication, such as text messages, voice calls, and instant messages. The user may want to provide his location to another conversation participant across these disparate communication mediums. Particular embodiments of the present disclosure allow aggregation of these communication types on an interface of the other participants while also providing location information.

Certain embodiments of the invention may include none, some, or all of the above technical advantages. One or more other technical advantages may be readily apparent to one skilled in the art from the figures, descriptions, and claims included herein.

DESCRIPTION OF EXAMPLE EMBODIMENTS

Figure 1:
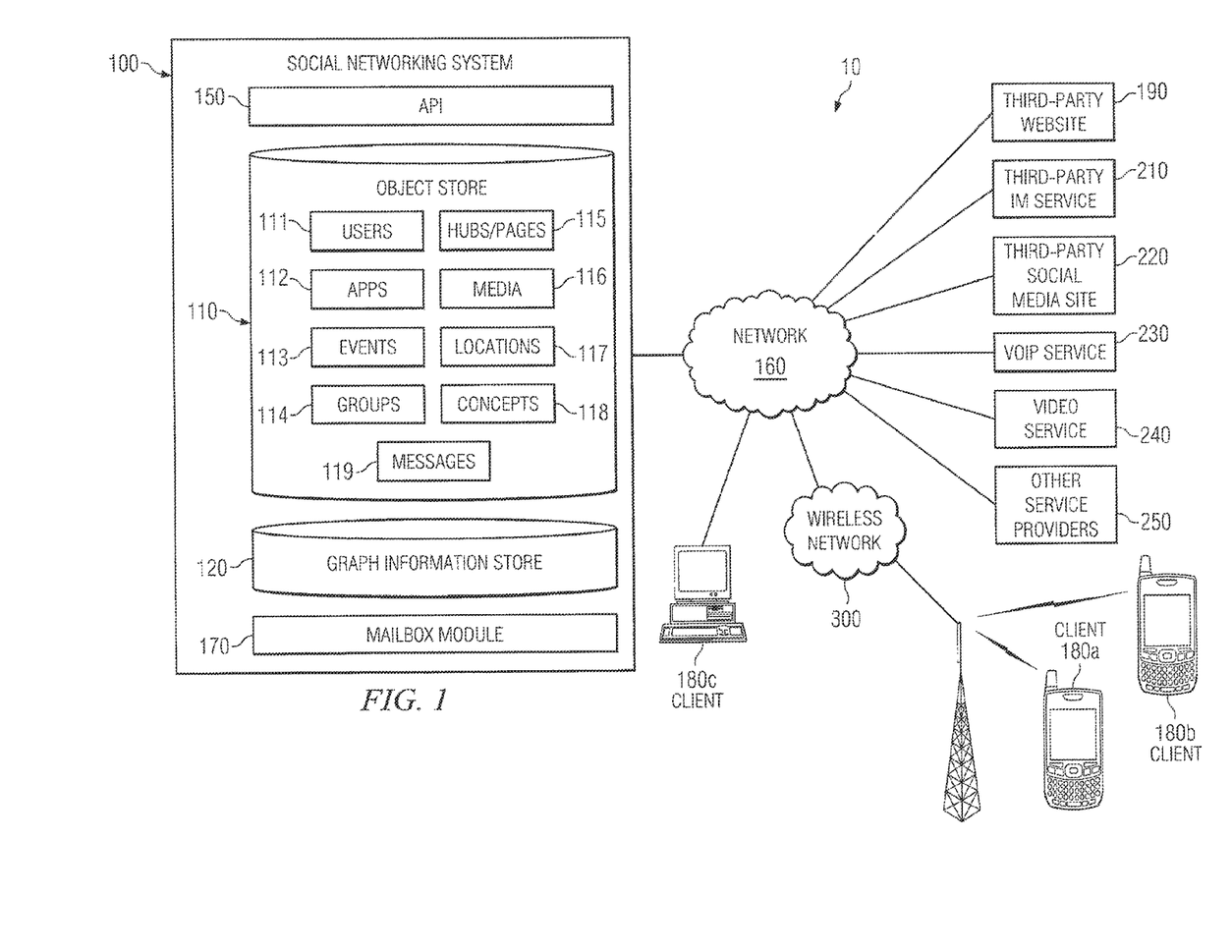
FIG. 1 illustrates an example social networking environment.

FIG. 1 illustrates an example social networking environment 10. Social networking environment 10 may include a social networking system 100, client devices 180a, 180b, and 180c, network 160, wireless cellular network 300, and third-party services including third-party websites 190, third-party instant messaging (IM) service 210, third-party social media site 220, voice-over-Internet Protocol (VoIP) service 230, video service 240, and other third-party services 250. Social networking environment 10 may include any suitable number of client devices 180. Client devices 180 may comprise any type of mobile or stationary computing device, including a mobile phone, personal digital assistant, laptop, netbook, ultrabook, tablet, desktop computer, cable box, television, or other suitable device. In the illustrated embodiment, client devices 180a and 180b are depicted as mobile phones and client device 180c is depicted as a desktop computer. Client devices 180a and 180b may connect to network 160 through wireless cellular network 300 and may be coupled to client device 180c through network 160.

Network 160 may include one or more interconnected networks over which various systems and hosts described herein may communicate. This disclosure contemplates any suitable network 160. As an example and not by way of limitation, one or more portions of network 160 may include an ad hoc network, an intranet, a private network, an extranet, a virtual private network (VPN), a local area network (LAN), a wireless network, a wireless LAN (WLAN), a wide area network (WAN), a wireless WAN (WWAN), a metropolitan area network (MAN), a portion of the Internet, a packet-based wide-area network, a portion of the Public Switched Telephone Network (PSTN), a cellular telephone network, a satellite network, a paging network, or a combination of two or more of these.

Wireless cellular network 300 may include one or more interconnected networks over which various systems and hosts described herein may communicate. This disclosure contemplates any suitable wireless cellular network 300. For example, wireless cellular network 300 may include one or more base stations that communicate wirelessly with one or more client devices 180. Wireless cellular network may facilitate communication between client devices 180, network 160, and other components coupled to network 160.

Third-party websites 190 may include, but are not limited to, social-networking websites, shopping sites, review sites such as Yelp!, or any third-party website with which a user maintains an account to interact with content or other users. Third-party IM service 210 may include, but is not limited to, Google Chat or a similar service allowing users to send instant messages to each other. Third-party social media site 220 may include, but is not limited to, Twitter, LinkedIn, Google Plus, or other social media site. VoIP service 230 may include, but is not limited to, Skype or a similar service that offers voice calls over IP. Video service 240 may include, but is not limited to, FaceTime, Tango, or other similar service that offers video calls. Other services 250 may include e-mail servers, storage facilities, or other third-party services that may communicate with social networking system 100 or clients 180 through network 160.

A client device 180 may interact with the third-party services through a web browser or a dedicated application local to the client device 180. For example, client devices 180 may interact with third-party instant messaging service 210, such as Google Chat, by logging into a user's Gmail account via a web browser or by installing and running a dedicated Google Talk application. Similarly, a client device 180 may interact with a third-party social media site 220, such as Twitter, via a browser or through a dedicated Twitter application. Client devices may similarly communicate with third-party websites 190, VoIP service 230, video service 240, and other third-party services 250.

A user of a client device 180 interacts with the social networking system 100 via an application, such as a web browser or a dedicated application of client device 180, to perform operations such as browsing content, posting and sending communications, retrieving and sorting communications received from other users, and the like. Communications may be in any suitable format such as electronic mail ("e-mail") messages, chat messages, comments left on a user's webpage, and short message service (SMS) text messages. Messages may contain text or other content such as pictures, videos, sounds, and attachments. Each user has a mailbox that includes communications that are both sent and received by the user.

Client device 180a may also interact with other client devices 180 through wireless network 300 or network 160. For example, client device 180a may participate in VoIP or non-VoIP calls with other cellular phones, computers, landlines, or other communication devices, transmit and receive texts or multi-media message through the SMS or multimedia messaging service (MMS) channels, or receive push notifications through the SMS control channel.

Third party services may interact with social networking system 100 via an application programming interface (API) 150. For example, a third party website 190 may perform operations supported by API 150, such as delivering user communications to social network system 100, retrieving user communications stored by social networking system 100, and obtaining social information about users of social networking system 100.

Social networking system 100 enables users to interact with each other through the system. Social networking system 100 may create and store a record, often referred to as a user profile, for each user. The user profile may include a user's contact information, background information, employment information, demographic information, personal interests, or other suitable information. Each user profile may be stored as an object in object store 110. Social networking system 100 may also create and store a record of a user's relationship with other users in social networking system 100. In particular embodiments, this information may be stored as a social graph in a graph information store 120. In the social graph, individuals, groups, entities, or organizations may be represented as nodes in the graph, and the nodes may be connected by edges that represent one or more specific types of interdependency. Social networking system 100 may also provide services (e.g., wall-posts, photo-sharing, event organization, messaging, games, or advertisements) to facilitate social interaction between users in the social networking system 100. Social networking system 100 may provide content and communications related to its services to a user's client device 180 over network 160.

Mailbox module 170 of social networking system 100 provides functionality for powering the messaging system of social networking system 100. In a particular embodiment, the mailbox module 170 receives, organizes, and presents communications to or from users in the social networking system 100 via an interactive user interface. The interactive user interface may be, for example, a webpage that is viewed by a user with a web browser or a dedicated application residing on the user's computing device 180. In particular embodiments, the interactive user interface may be a combination of server and client side rendering, depending on processing and bandwidth capacity. Functionality provided by mailbox module 170 may include organizing communications into conversations, quick reply, categorizing conversations, conversation states, conversation searching, new message notification, formatting of e-mails, forwarding communications between conversations, and invitation-based conversation, among others. In particular embodiments, communications occurring outside of the social networking system 100 are aggregated with communications occurring through the social networking system by mailbox module 170 at any suitable time, such as when a client device 180 performs an aggregation operation. In particular embodiments, communications requiring interaction with third-party services are pulled automatically through one or more APIs 150 and stored at mailbox module 170. In particular embodiments, a mixture of client-push and server-pulls are used to aggregate communications from various sources at mailbox module 170. In particular embodiments, a local application on a client device 180 performs one or more of the operations of mailbox module 170 and pulls communications from social network 100 and third-party services to client device 180.

Particular embodiments of social networking environment 10 facilitate communication and display of the location of a client device 180 on one or more other client devices 180 during a communication session. In one example embodiment, users of client devices 180a and 180c may communicate with one another using an instant messaging application. The user of client device 180a is in transit to meet the user of client device 180c and, as such, decides that the location of client device 180a should be communicated to client device 180c. The location then may be displayed on a graphical user interface (GUI) of client device 180c as a pin on a map. The users of client devices 180a and 180c may continue their instant messaging communication session while the user of client device 180a travels to meet the user of client device 180c and while the location of client device 180a is displayed on the map of the GUI of client device 180c. To add on to this example, the user of client device 180b additionally may be added to the instant messaging communication session. The user of client device 180b is also in transit to meet the user of client device 180c. The user of client device 180b also decides to communicate the location of client device 180b to the user of client device 180c. The location of client device 180c then may also be displayed on map of the GUI of client device 180c. In this way, the user of client device 180c may follow the progress of the users of client devices 180a and 180b as they make their way to user of client device 180c.

Figure 2A:
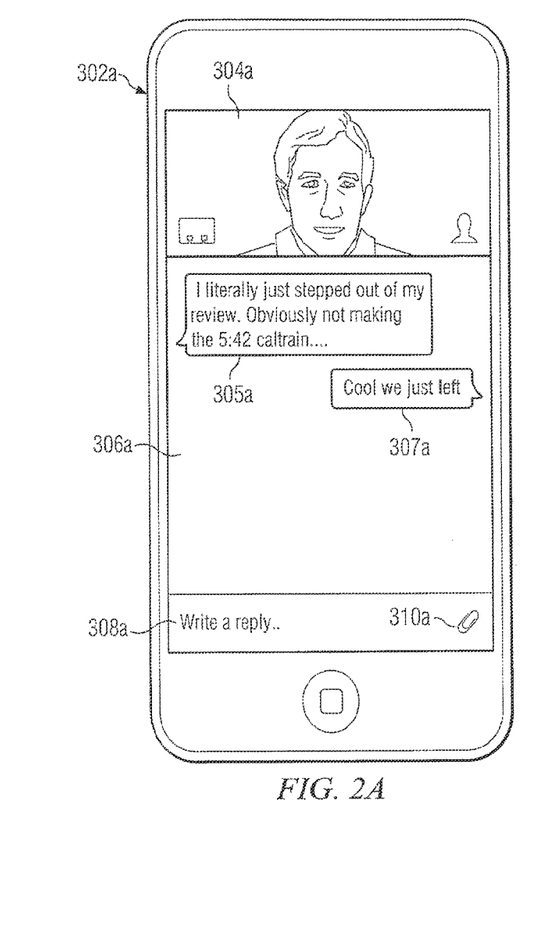
FIGS. 2A and 2B illustrate example graphical user interfaces for two client devices participating in a communication session.
Figure 2B:
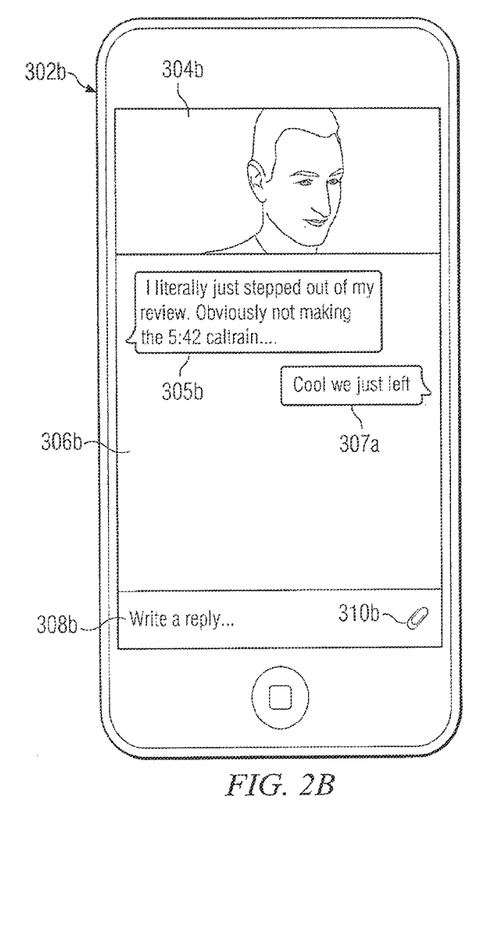

FIGS. 2A and 2B illustrate example GUIs 302 for two client devices, such as client devices 180, participating in a communication session with one another. Users of the client devices corresponding to GUIs 302 communicate with one another using any suitable communication mechanism, such as those discussed above with respect to social networking environment 10 of FIG. 1. For illustrative purposes, GUI 302a appears on a client device of User 1 and GUI 302b appears on a client device of User 2. User 1 and User 2 may communicate with each other and/or other users. GUIs 302 include image panes 304 operable to display any suitable image. In particular embodiments, image pane 304a displays a picture of User 2. Likewise, image pane 304b displays a picture of User 1. User 1 and User 2, in certain embodiments, may select a picture to be shown on the other user's client device during a communication session. These pictures may be sent from the origination device upon the start of a communication session or may be pre-selected and stored, for example, in user profile area 111 of object store 110. These images may also be maintained by third-party website 190, third-party IM service 210, or any other suitable service. The preselected image may be transmitted to the other session participants at the beginning and/or during a communication session. In alternative embodiments, User 1 chooses the image depicted on User 1's client device, in image pane 304a. Likewise, User 2 may choose the image depicted on User 2's client device, in image pane 304b.

GUIs 302 also include message panes 306. Message panes 306 display communications between User 1 and User 2. Communications may be any suitable type of communications. For example, a communication may be an SMS or MMS message, a call (e.g., a phone call, VoIP session, a video call), a voicemail, a push-to-talk (PTT) message, an email, an instant message, a tweet, a chat, a social network message (including a post on a wall of a social network website or a message sent via a social network website), or other communication between the users of the client devices. A communication may include text exchanged during the communication (e.g., the actual text of the communication or a voice transcription of the communication) or any suitable information regarding the communication, such as the time or duration of the communication, whether the communication was an outgoing, incoming, or missed communication, or other suitable information.

Message panes 306 may include various types of communications aggregated into a single communication thread. For example, if User 1 sends an instant message to User 2 and also separately sends an e-mail to User 2, both of these messages may be placed into the same communication thread and, thus, appear on message panes 306. Similarly, if User 2 leaves User 1 a voicemail, an indicator of the voicemail (such as the date and time it was left) or transcribed text from the voicemail may be placed into message panes 306. As another example, if User 1 calls User 2, the log of the call may also be placed in the message panes 306.

In particular embodiments, message panes 306 display communications in the same format regardless of the type of the communications. For example, in certain embodiments, communication 305 is transmitted in an e-mail and communication 307 is transmitted via an SMS text message. As shown in FIGS. 2A and 2B, communication 305 and communication 307 each appear in a conversation bubble. Thus, the messages in message panes 306 may appear in a similar format regardless of the type of the particular communication. In other embodiments, the format of the communications that appear in message panes 306 may depend on the type of the communication. In such embodiments, communication 305 and communication 307 may appear alongside different icons, such as an icon depicting an envelope for an e-mail or an icon depicting a phone for an SMS text message.

The messages that appear in message panes 306 may appear in any suitable order. For example, messages may be ordered based on the time of the communications, the types of the communications, the importance of the communication, or any other suitable factor. In particular embodiments, messages of a particular type may be grouped together, and the group including the most recent communication may be displayed first. In other embodiments, a communication marked as important may be displayed before the most recent communication. In some embodiments, a subset of communications of a particular communication type are grouped together. For example, emails having a common subject may be grouped together.

Communications between User 1 and User 2 may be identified by the client devices in any suitable manner. The communications may be stored at any suitable location, such as client device 180, social networking system 100, a third-party service, or a combination of the preceding. An application local to device 180, residing at a server hosted by social networking system 100 (or at another suitable network location) may aggregate communications between specific users engaging in communications, regardless of where the communications are stored.

In particular embodiments, the application may communicate with devices 180, social networking system 100, or third-party services 190, 210, 220, 230, 240, or 250 to aggregate communications between users communicating messages to one another. For example, the application may receive communications from the social networking system 100 or the third-party services and determine users that are participants in the communications. Accordingly, when the application receives a request for a conversation between particular users, the application may identify communications in which the users are participants. Any suitable identifying information may be used to identify the participants in a communication with one another. For example, the telephone number, network address, user profile identifier, or other suitable identifying information may be used to identify communication participants.

In particular embodiments, social networking system 100 may facilitate determination of the participants in a communication session. Users of social networking system 100 may be stored as objects in the social networking system 100. For example, as described above, object store 110 may include a profile for each user that comprises a profile name, an e-mail address, a profile picture, and other identifying information. Particular communications may include identifying information that matches identifying information included in the profile of a user stored in object store 110. Accordingly, one or more users of the social networking system 100 that participated in the communication may be identified by accessing information stored by object store 110. For example, an e-mail from firstname.lastname@yahoo.com can be identified from information in the object store 110 as being an e-mail from the user James White. As another example, a video chat facilitated through third-party video service 240 may involve participants that have a specific user ID. In particular embodiments, this user ID is stored with the user profile in object store 110 and used to identify the social network users that participated in the video chat.

Messaging panes 306 can be updated in a real-time manner as new communications are received or sent. Messaging panes 306 may allow a user to scroll backwards in time (or other order) to view the entire history of communications in messaging panes 306. In a particular embodiment, some of the communications have attachments such as pictures, videos, documents, or other files. The attachments can be shown in the messaging panes 306 through a preview of the attachment instead of just a link to the attachment. For example, an attached picture can be shown in the interface with a thumbnail of the picture.

GUIs 302 also include message entry areas 308 that User 1 or User 2 may use to draft and transmit a communication to each other or another user. Message entry areas 308 may display a keyboard, activate a speech recognition application, or effectuate other text entry means in response to a touch or other selection from the users. After text is entered via the keyboard, through the speech recognition application, or through other means, the text may be transmitted to the other users via any suitable format. By way of example and not limitation, the text may be transmitted according to a communication type described above. In particular embodiments, the default communication type used to transmit the text is an SMS message, but any other suitable type may be used such as an email or social network message. In a particular embodiment, the communication type is based on a telephone number, network address, or other identifier associated with the incoming call. For example, if the incoming call is associated with a mobile phone number, the communication type may default to an SMS message, whereas if the incoming call is associated with a home phone number, then a different communication type such as an email may be used. In particular embodiments, the communication type is selected based on the contact information available for the users of the client devices or the communication history between the users engaging in communication. For example, if the majority of communications between User 1 and User 2 are e-mail, the text entered in message entry area 308 may be sent via email. Message entry area 308 may also include the option to attach a file to the communication, such as a picture, video, document, or other file, which may be accessed via option tool 310. In certain embodiments, option tool 310 may also be used to request that a location of a client device for User 1 or User 2 be sent to the client device of the other user. The user may select option tool 310 by, for example, touching a touch screen, pressing a mechanical button such as key of a keypad or a button of a mouse, or in any other suitable manner.

Figure 3A:
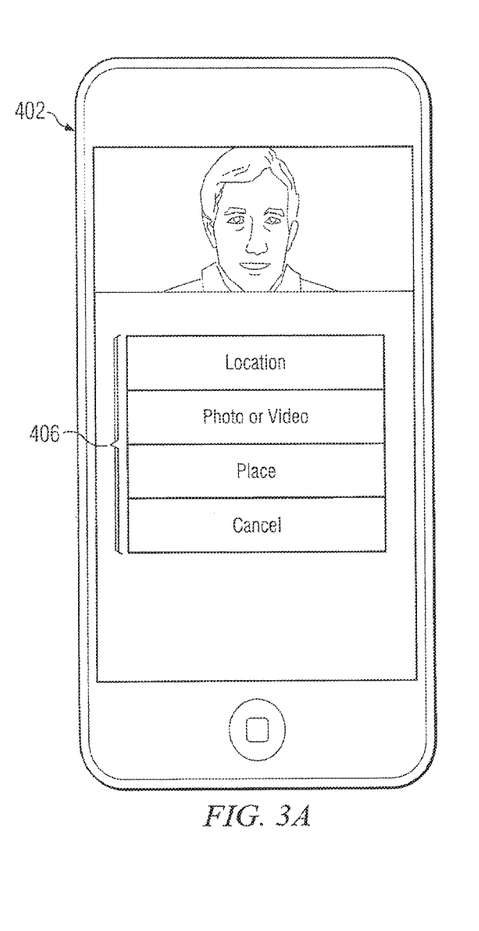
FIGS. 3A and 3B illustrate example graphical user interfaces for a client device that receives a request to share its location with one or more other client devices.
Figure 3B:
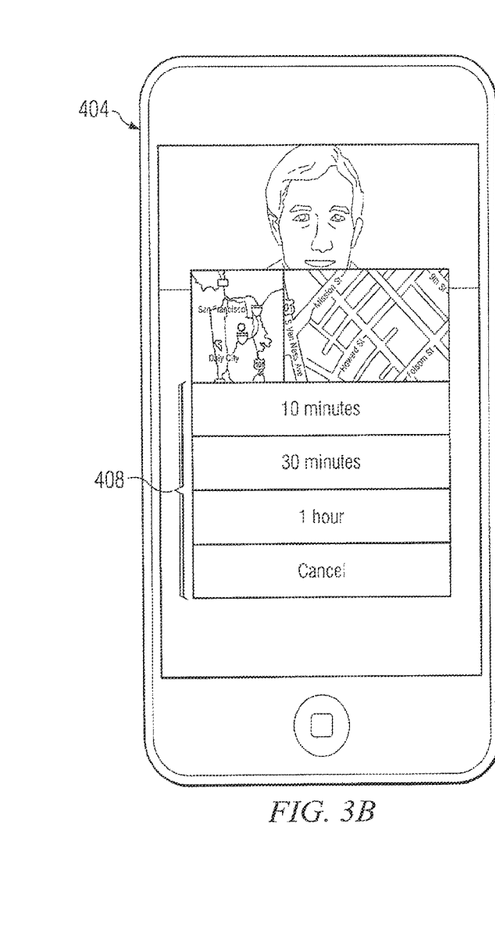

FIGS. 3A and 3B illustrate example GUIs for a client device, such as client device 180, that receives a request to share its location with one or more other client devices. In certain embodiments, GUIs 402 and 404 represent successive screens following a user's selection of option tool 310a of GUI 302a. For illustrative purposes, GUIs 402 and 404 represent successive screens on the client device of User 1 from FIG. 2A. GUI 402 includes a menu 406 with choices available to User 1. In particular embodiments, menu 406 includes "Location," "Photo or Video," "Place," or "Cancel" selection options. In order to share location, the user of the client device selects the "Location" option using any suitable user input mechanism, such as touching a touchscreen at an area sufficiently proximate to the "Location" option on the touchscreen.

Upon choosing to share location, the user of a client device may configure various options associated with the sharing. As one non-limiting example, the user may specify timing attributes associated with the sharing location information as shown in GUI 404. GUI 404 represents a screen the user may see after selecting the "Location" option in menu 406. GUI 408 includes a menu 408 with timing choices available to a user of a client device. In embodiments where the location of client device is shared periodically, these timing choices may represent how often the location is communicated to the other client devices. For example, a selection of "10 minutes" may direct the client device to share its location once every ten minutes. A selection of "30 minutes" may direct the client device to share its location once every 30 minutes while a selection of "1 hour" may direct the client device to share its location once every hour. While the options shown in the depicted embodiment are ten minutes, 30 minutes, and one hour, any suitable amount of time may be selected. Smaller time intervals may have the effect of the location of the client device being shown in "real-time" on the recipient client devices. These selections may have repercussions on battery life if the client device is a mobile phone, for example. Using location-determining functionality frequently on a mobile client device may consume battery power more quickly than using location-determining functionality less frequently.

In particular embodiments, the timing options presented in menu 408 represent a time period during which location information will be communicated to recipient devices. For example, a selection of "10 minutes" may direct a client device to communicate its location in any suitable time interval for the next ten minute period. A selection of "30 minutes" may direct a client device to communicate its location in any suitable time interval for the next thirty minute time period. A selection of "1 hour" may direct a client device to communicate its location in any suitable time interval for the next hour. Any other suitable timing choices may also be made available to the user. For example, the user may be presented with a "Continuous" option that directs the client device to communicate location information in any suitable time interval to recipient client devices indefinitely.

Where appropriate, the user may have various other choices when choosing to share location information of a client device with other client devices. In certain embodiments, these options may be presented in GUIs similar to GUIs 402 and 404. For example, the user may be presented with an option to select which specific users of those who are apart of a group communication session will receive the location information. As another example, the user may select an image that may be displayed to recipient user when the location is displayed on their client device.

In particular embodiments, these options may be determined prior to the user requesting that location information be sent to recipient devices and/or prior to the communication session. These options may be stored locally on the client device, in a third-party service such as third-party website 190, in object store 110, or in any other suitable location. For example, an application on the client device may be configured to automatically communicate location information to recipient devices during a communication session. In some embodiments, the user may provide a list of users to whom location information should be communicated during a communication. As another example, the timing considerations (e.g., time limit, periodic delay amount, etc.) may be pre-configured before a communication session begins and/or before a request is received to communicate location information.

The location of the client device may be determined in any suitable manner. For example, an application on the client device may use cell tower triangulation, Wi-Fi positioning, and/or GPS positioning to determine location information of the client device. As another example, a geographic location of an Internet-connected computing device may be identifiable by the computing device's IP address. The location information may be communicated as geographic coordinates, address information, the name of building/business, and/or in any other suitable manner. The location information may be communicated directly to the recipient devices and/or to a service, such as social networking system 100, which may then communicate the location information to recipient devices.

Figure 4A:
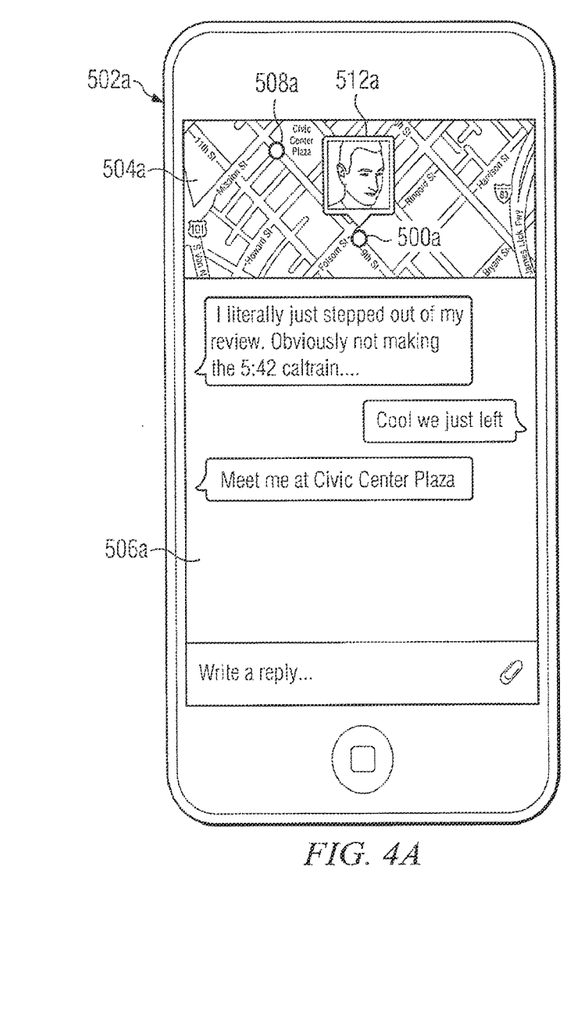
FIGS. 4A and 4B illustrate example graphical user interfaces for a client device that receives location information from another client device.
Figure 4B:
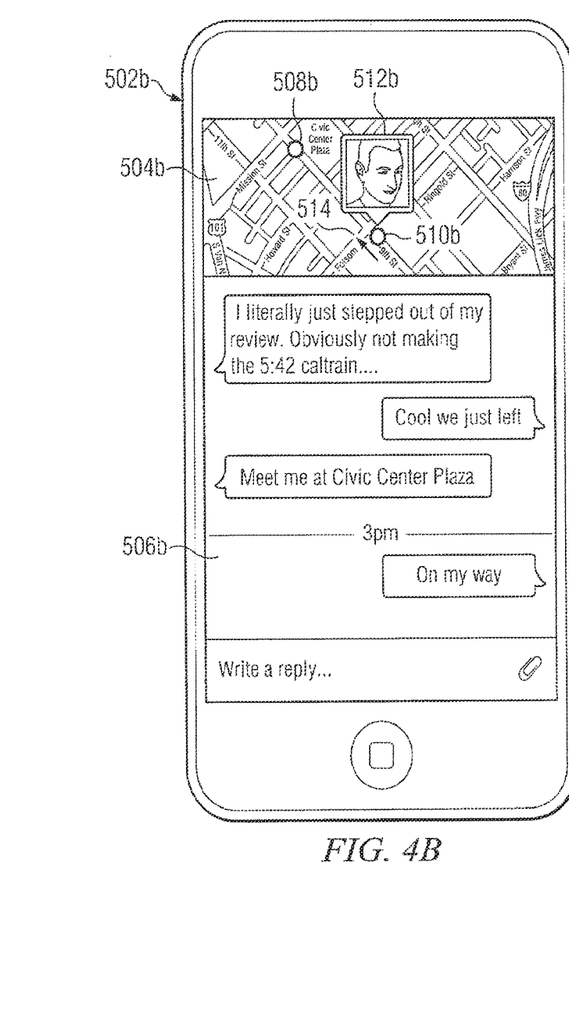

FIGS. 4A and 4B illustrate example GUIs for a client device, such as client device 180, that receives location information from another client device. In particular embodiments, GUIs 502a and 502b represent successive screens on a client device that receives location information from another client device. For illustrative purposes, GUIs 502a and 502b are successive screens on the client device of User 2 from FIG. 2B. Image panes 504 display a map that indicates location information for certain client devices involved in a communication session. Message panes 506 indicate messages being exchanged while location information is being displayed in image panes 504.

In contrast to image pane 304b that displayed solely an image of User 1, image panes 504 display a map. On the map, pin indicators 510 indicate the location of User 1's client device. Pin indicator 510b may be in a different location than pin indicator 510a, which may indicate that the location of User 1's client device has changed. Profile pictures 512 display an image of User 1. In certain embodiments, arrow 514 indicates a direction of travel of User 1's client device. In some embodiments, the direction may be embedded in the location information received from User 1's client device or from a social networking system or third-party service. In other embodiments, the direction may be determined by User 2's client device by comparing previously received location information to current location information to determine a directional vector. In certain embodiments, the direction of travel may be indicated textually instead of or in addition to arrow 514. Image panes 504 may also include pin indicators 508, which indicate the location of User 2's client device. The recipient client device may determine its own location using any of the methods described above. This may assist User 2 in locating User 1 in relation to User 2. In some embodiment, a directional vector of User 2 may be shown that indicates User 2's direction of travel similar to arrow 514. Additionally, in communication sessions with more than two participants, multiple other pin indicators may be shown representing the locations of other client devices that are also transmitting their location information.

Although depicted generally at the top of GUIs 502, image panes may appear in any suitable location. By way of example, image panes 504 also could be displayed at the bottom, left, or right of message panes 506b. In certain embodiments, messaging panes 506 may appear as a translucent overlay on top of image panes 504. Likewise, image panes 504 may appear as a translucent overlay on top of messaging panes 506. In certain embodiments, image pages 504 and messaging panes 506 may appear on the user's display one at a time. In such embodiments, the other pane may be accessible by dragging the screen using a mouse (e.g., to the left, right, up, down, etc.); by using a finger swipe on a touch screen (e.g., to the left, right, up, down, etc.), by depressing a mechanical key on the client device, or any other suitable method. As shown in these examples, the user may have multiple options for display of location information of another user's client device and the messages themselves during a communication session.

In certain embodiments, the location information may be displayed as text rather than as a location on a map. For example, the location may appear as an address (or any portion thereof), as an intersection, and/or as geographic coordinates. As another example, the location may appear as the name of a building, place of business, and/or any other landmark. These names may be determined, for example, by comparing geographic position with a database of buildings, business, and/or landmarks stored in a social networking system, a third-party service, and/or in any other suitable system. The textual location information may appear in a dedicated position on the screen distinct from an area designated for the other communications between User 1 and User 2. The position of the textual location information on GUIs 502 may be configurable by User 2 (and/or User 1), through options specified in a client application localized to a client device and/or stored in a social networking system or other third-party service. As another example, the textual location information may appear directly in the textual communication stream that contains the other communications between User 1 and User 2. In some embodiments, the location of the transmitting device may be depicted both graphically and textually at the same time.

Figures 5, 6:
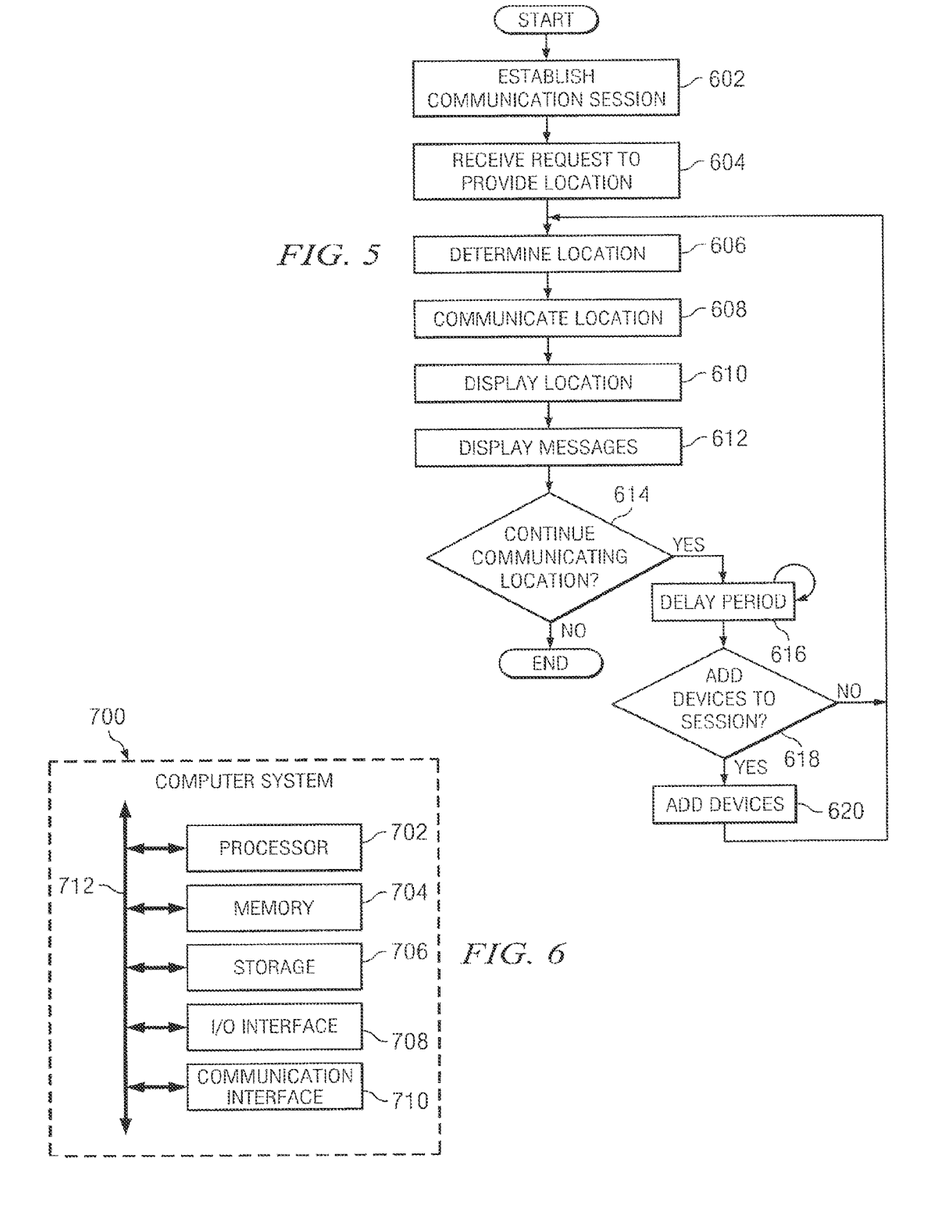
FIG. 5 illustrates an example method for sharing location information of a client device with one or more other client devices.
FIG. 6 illustrates an example computing system.

FIG. 5 illustrates an example method for sharing location information of a client device with one or more other client devices. The method may begin at step 602, where a communication session is established between two or more client devices. In certain embodiments, this step comprises re-establishing a prior communication session between users of client devices, such that the continued conversations appear on a display of the client device along with the prior conversations. A social networking system, third-party service, the client device may establish the communication session among the participating client devices. At step 604, a request is received to provide location information of a client device to one or more other devices. This request may occur during the communication session or, in certain embodiments, may occur outside of the communication session as a pre-programmed configuration or as part of an initial user set up of a location-sharing feature. At step 606, the location of the computing device is determined. A social networking system or a third-party service may determine the location of the computing device by receiving the location information from a client device, which may determine its own location in any suitable manner as previously described. At step 608, the determined location may be communicated to one or more other recipient client devices, which may be displayed on such recipient devices at step 610. At step 612, additional intervening messages made by the participants of the communication session may be displayed on the client devices. These messages may be displayed while the recipient client device is displaying the determined location of the client device that is sharing its location. At step 614, the method determines whether the transmitting client device will continue to share its location information. If not (e.g., because a specified time limit has passed), the method may end. If the transmitting client device will continue to share its location information, the method continues to step 616. At step 616, the method waits for a specified time before determining updated location information. At 618, the method determines whether there are any additional devices to add to the communication session. For example, one of the participants may choose to add another user to the communication session using an application residing on the client device. If not, the method returns to step 606, where updated location information of the transmitting client device is determined. If so, the additional devices are added during step 620. The method then returns to step 606 to determine updated location information. If additional devices have been added, those additional devices may also receive the updated location information to display on their on GUIs.

Particular embodiments may repeat the steps of the method of FIG. 5, where appropriate. Moreover, although this disclosure describes and illustrates particular steps of the method of FIG. 5 as occurring in a particular order, this disclosure contemplates any suitable steps of the method of FIG. 5 occurring in any suitable order and/or in parallel. For example, the request to provide location information may occur at step 604 before a communication session is established at step 602. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5. Additionally, the method may include more, fewer, or different steps. For example, at step 618 client devices may be removed as well as added depending on the choices of the participating users. Removed client devices may not receive the updated location information.

FIG. 6 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple datacenters; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include an HDD, a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

This disclosure contemplates one or more computer-readable storage media implementing any suitable storage. In particular embodiments, a computer-readable storage medium implements one or more portions of processor 702 (such as, for example, one or more internal registers or caches), one or more portions of memory 704, one or more portions of storage 706, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a first computing device, receiving user input on a graphical user interface of the first computing device to provide location information associated with the first computing device to one or more second computing devices;
by the first computing device, accessing a current location of the first computing device; and
by the first computing device, sending the current location of the first computing device to the one or more second computing devices to be displayed within a graphical user interface of each second computing device;
by the first computing device, periodically updating the location of the first computing device and periodically communicating the location of the first computing device to the one or more second computing devices to be displayed on the graphical user interface of each second computing device.

2. The method of claim 1, further comprising:
ending communication of the current location of the first computing device to the one or more second computing devices within a specified time limit.

3. The method of claim 1, wherein the first computing device is one of a plurality of devices associated with a first user and the graphical user interface of each of the second computing devices displays the current location of the first computing device and a communication from another of the plurality of devices associated with the first user.

4. The method of claim 1, wherein the current location of the first computing device is displayed on the graphical user interface of each of the second computing devices concurrently with one or more messages between the first computing device and the second computing devices.

5. The method of claim 1, further comprising communicating the current location of the first computing device to a third computing device, wherein the current location of the first computing device is displayed on a graphical user interface of the third computing device at the same time as the current location of the first computing device is displayed on the graphical user interface of the second computing devices.

6. The method of claim 1, further comprising communicating the current location of the first computing device to a third computing device, wherein the current location of the first computing device and locations of one or more second computing devices are displayed on a graphical user interface of the third computing device.

7. The method of claim 1, wherein the graphical user interface of each second computing device indicates a direction of travel of the first computing device.

8. The method of claim 1, wherein the graphical user interface of the first computing device is associated with a messaging application of the first computing device.

9. The method of claim 1, wherein the user input is further based on one or more preferences indicated by a user of the first computing device for sharing location information of the first computing device.

10. The method of claim 9, wherein the preferences comprise an indication to automatically share the current location of the first computing device to one or more second computing devices when a communications session is established with the one or more second computing devices.

11. The method of claim 9, wherein the preferences comprise one or more frequencies for sharing the current location of the first computing device.

12. The method of claim 9, wherein the preferences comprise an identification of one or more particular second users that are permitted to receive the current location of the first computing device.

13. A system comprising:
one or more processors; and
a memory coupled to the processors comprising instructions executable by the processors, the processors being operable when executing the instructions to:
receive user input on a graphical user interface of the first computing device to provide location information associated with the first computing device to one or more second computing devices;
access a current location of the first computing device; and
send the current location of the first computing device to the one or more second computing devices to be displayed within a graphical user interface of each second computing device;
periodically update the location of the first computing device and periodically communicate the location of the first computing device to the one or more second computing devices to be displayed on the graphical user interface of each second computing device.

14. The system of claim 13, wherein the processors are further operable to end communication of the current location of the first computing device to the second computing devices within a specified time limit.

15. The system of claim 13, wherein the graphical user interface of each second computing device is operable to display the current location of the first computing device concurrently with one or more messages between the first computing device and the second computing device.

16. The system of claim 13, wherein processors are further operable to communicate the current location of the first computing device to a third computing device, wherein the current location of the first computing device is displayed on a graphical user interface of the third computing device at the same time as the current location of the first computing device is displayed on the graphical user interface of the second computing devices.

17. The system of claim 13, wherein the processors are further operable to communicate the current location of the first computing device to a third computing device, wherein the current location of the first computing device and locations of one or more second computing devices are displayed on a graphical user interface of the third computing device.

18. One or more computer-readable non-transitory storage media embodying logic that is operable when executed to:
receive user input on a graphical user interface of the first computing device to provide location information associated with the first computing device to one or more second computing devices;
access a current location of the first computing device; and
send the current location of the first computing device to the one or more second computing devices to be displayed within a graphical user interface of each second computing device;
periodically update the location of the first computing device and periodically communicate the location of the first computing device to the one or more second computing devices to be displayed on the graphical user interface of each second computing device.

* * * * *